United States Patent [19]

Fukaya

[11] Patent Number: 5,184,294
[45] Date of Patent: Feb. 2, 1993

[54] APPARATUS FOR GENERATING NUMERICAL CONTROL INFORMATION FOR MACHINING PARTS

[75] Inventor: Yasushi Fukaya, Ooguchi, Japan

[73] Assignee: Kabushiki Kaisha Okuma Tekkosho, Aichi, Japan

[21] Appl. No.: 514,837

[22] Filed: Apr. 26, 1990

[30] Foreign Application Priority Data

Apr. 28, 1989 [JP] Japan .................. 1-111600

[51] Int. Cl.$^5$ ..................... G06F 15/46; G05B 19/92
[52] U.S. Cl. ............................. 364/191; 364/474.2
[58] Field of Search ..................... 364/188–192, 364/474.2–474.27

[56] References Cited

U.S. PATENT DOCUMENTS

| | | | |
|---|---|---|---|
| 4,723,203 | 2/1988 | Kishi et al. | 364/191 |
| 4,727,496 | 2/1988 | Ryouki | 364/474.25 |
| 4,734,864 | 3/1988 | Kawamura et al. | 364/474.24 |
| 4,878,172 | 10/1989 | Matsumura | 364/191 |
| 4,901,220 | 2/1990 | Matsumura et al. | 364/474.27 |
| 4,926,311 | 5/1990 | Matsumura et al. | 364/191 |
| 4,928,221 | 5/1990 | Belkhiter | 364/474.25 |
| 4,998,196 | 3/1991 | Seki et al. | 364/474.25 |
| 5,025,363 | 6/1991 | Seki et al. | 364/474.04 |

*Primary Examiner*—Jerry Smith
*Assistant Examiner*—Jim Trammell
*Attorney, Agent, or Firm*—Wenderoth, Lind & Ponack

[57] ABSTRACT

An apparatus for generating numerical control (NC) information automatically determines a division point if two steps are required for machining a part member, and produces NC information for each of divided portions, thereby reducing the time taken to prepare NC information for overall machining. The apparaus includes a division point determination unit for determining a division point between first and second steps based on a material shape, a part shape and a jaw shape supplied: a part shape division unit for generating a first step part shape and a second step part shape based on the division point, the material shape and the part shape: and a material shape division unit for generating a first step material shape and a second step material shape based on the division point, the material shape and the part shape. The numerical control information for the first step is formed from the first step material shape and the first step part shape, while the numerical control information for the second step is formed from the second step material shape and the second step part shape.

2 Claims, 9 Drawing Sheets

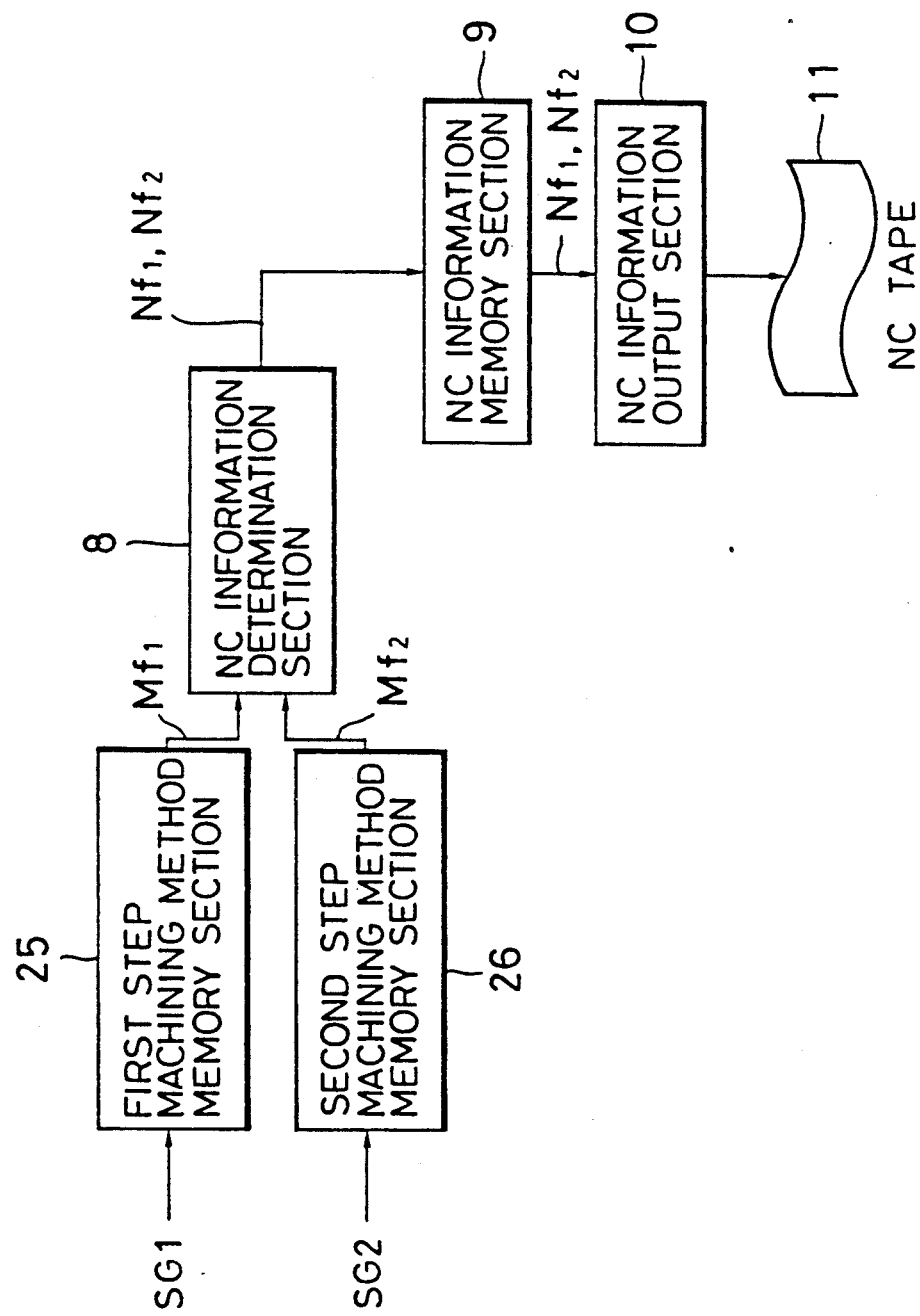
F I G. 3B to a machining method determination section 6 to determine machining method information $M_f$ on portions to be machined (end surface machining portions, outside diameter machining portions, inside diameter machining portions), cutting directions (←, ↓, →, and the like), cutting tools, cutting conditions (cutting speed, feed speed, spindle rotation speed, extend of cutting), and so on. The machining method information $M_f$ is stored in a machining method memory section 7. The machining method information $M_f$ stored in a machining method memory section 7 is read out to an NC information producing section 8 to produce NC information $N_f$ which is stored in an NC information memory section 9. The NC information $N_f$ stored in the NC information memory section 9 is output to a paper tape 11 or the like through an NC information output section 10 by the operation of the operator.

APPARATUS FOR GENERATING NUMERICAL CONTROL INFORMATION FOR MACHINING PARTS

BACKGROUND OF THE INVENTION

The present invention relates to an apparatus for generating numerical control (NC) information for machining parts.

Referring to FIG. 1 which is a block diagram of a conventional NC information generating apparatus, material shape information $B_f$ and part shape information $P_f$ input by an operator using a CRT 1 and a keyboard 2 are respectively stored in a material shape memory section 4 and a part shape memory section 5 through an input/display control section 3. The material shape information $B_f$ and the part shape information $P_f$ stored in the material shape memory section 4 and the part shape memory section 5 are read out The operation of the thus constructed apparatus will be described below with respect to a case where the NC information is prepared for machining to obtain a part shape such as that expressed in FIG. 2A. The operator inputs a material shape information and a part shape information such as those defined in FIG. 2B by using the CRT 1 and the keyboard 2. The machining method determination section 6 determines machining method information based on the supplied material shape information and part shape information, and the NC information producing section 8 produces the NC information for effecting machining as shown in FIG. 2C based on the determined machining method information. The operator makes the apparatus output this NC information through the medium of NC tape 11 for first process step. Next, the operator inputs the material shape information and the part shape information such as those defined in FIG. 2D by using the CRT 1 and the keyboard 2, and makes the apparatus output the NC information for effecting machining as shown in FIG. 2E through the medium of the NC tape 11 for a second process step, thereby completing the overall processing.

As described above for preparation of the NC information using the conventional NC information generating apparatus, the material shape information and the part shape information are input for each of different process steps, although only one shape is provided or formed as each of the material shape and the part shape. The conventional apparatus thus requires troublesome or time-consuming operations.

SUMMARY OF THE INVENTION

In view of such circumstances, an object of the present invention is to provide an NC information generating apparatus capable of forming, by inputting a material information and a part shape information only one time, an NC information for a process of working a part member which process requires two process steps.

According to one aspect of the present invention, for achieving the objects described above, there is provide an apparatus for generating numerical control information for working a part member, comprising: a division point determination means for determining a division point between a first and second steps based on a material shape, a part shape and a jaw shape supplied; a part shape division means for generating a first step part shape and a second step part shape based on the division point, the material shape and the part shape; and a material shape division means for generating a first step material shape and a second step material shape based on the division point, the material shape and the part shape; wherein numerical control information for the first step is formed from the first step material shape and the first step part shape, while numerical control information for the second step is formed from the second step material shape and the second step part shape.

The nature, principle and utility of the invention will become more apparent from the following detailed description when read in conjunction with the accompanying drawings.

BRIEF DESCRIPTION OF THE DRAWINGS

In the accompanying drawings:

FIGS. 3A and 3B are block diagrams of an NC information generating apparatus in accordance with an embodiment of the present invention;

DESCRIPTION OF THE PREFERRED EMBODIMENT

Figure 1:
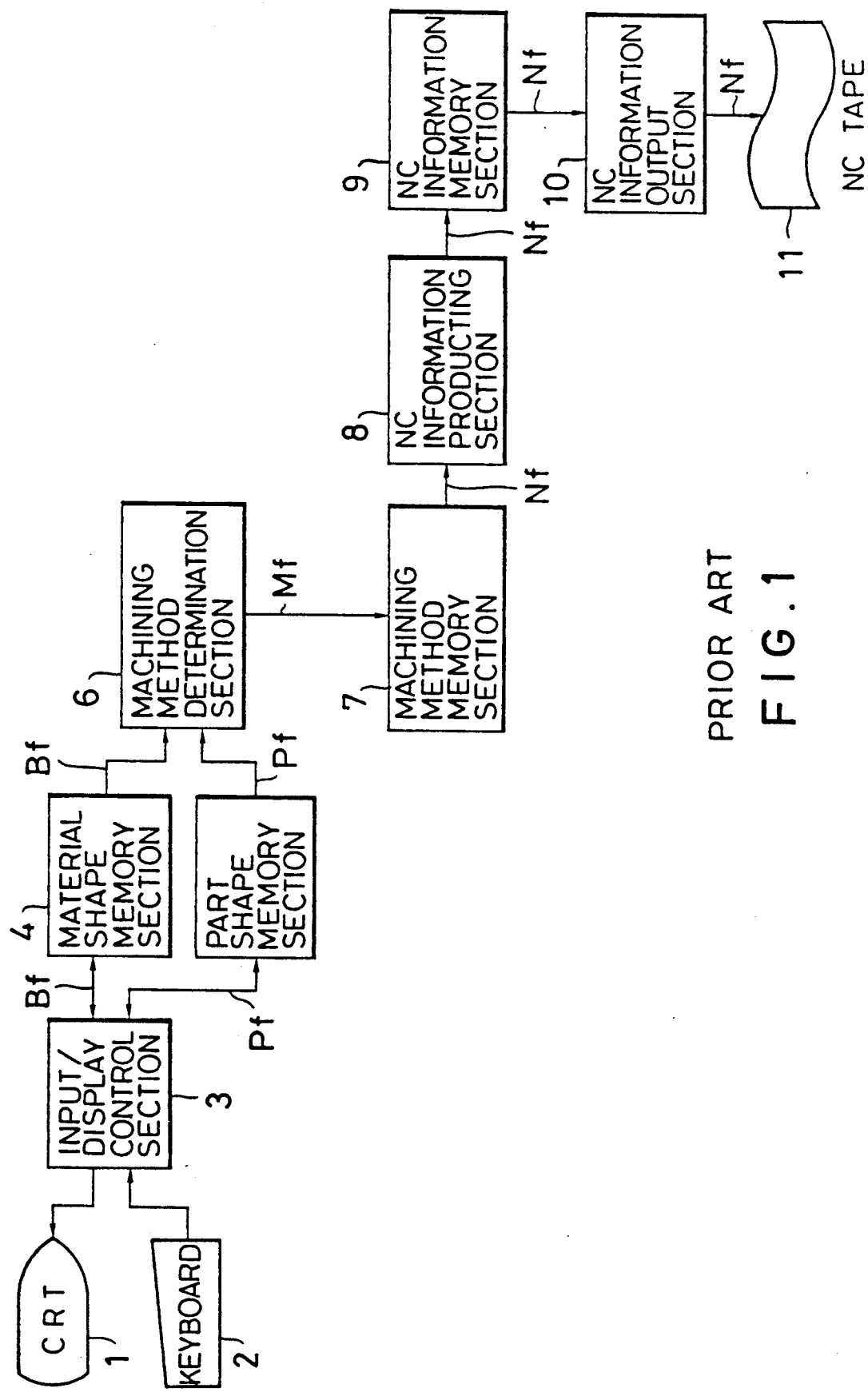
FIG. 1 is a block diagram of an example of a conventional NC information generating apparatus.
Figure 2A:
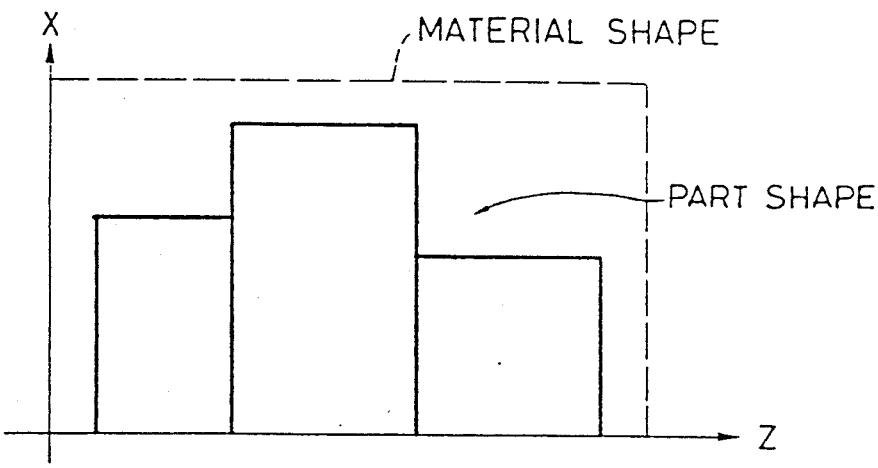
FIGS. 2A to 2E are diagrams of an example of the operation of the apparatus shown in FIG. 1.
Figure 2B:
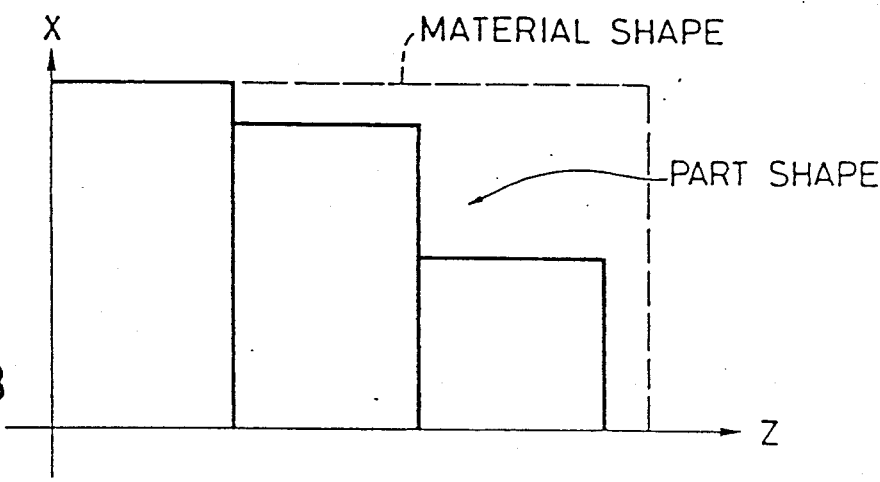
Figure 2C:
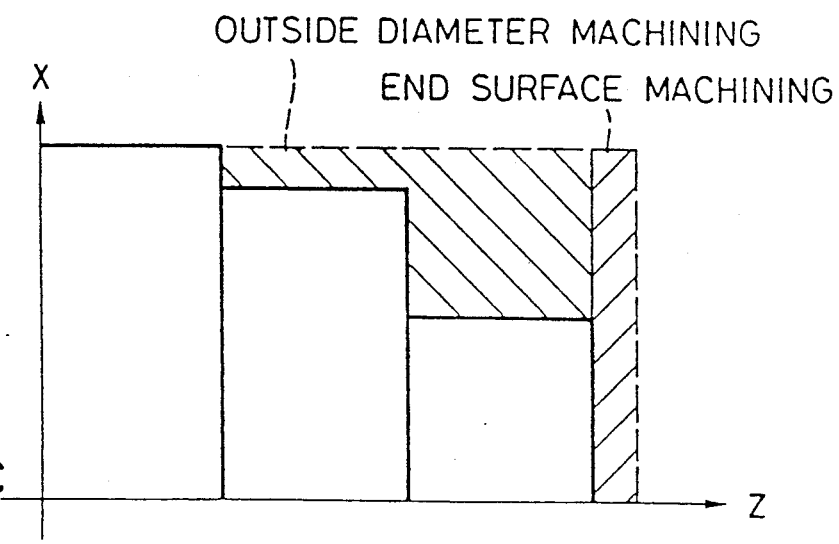
Figure 2D:
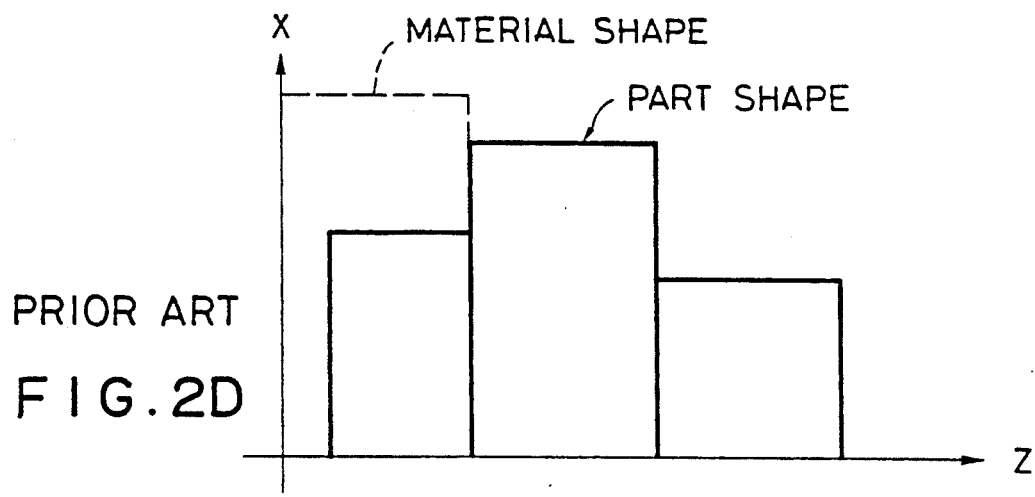
Figure 2E:
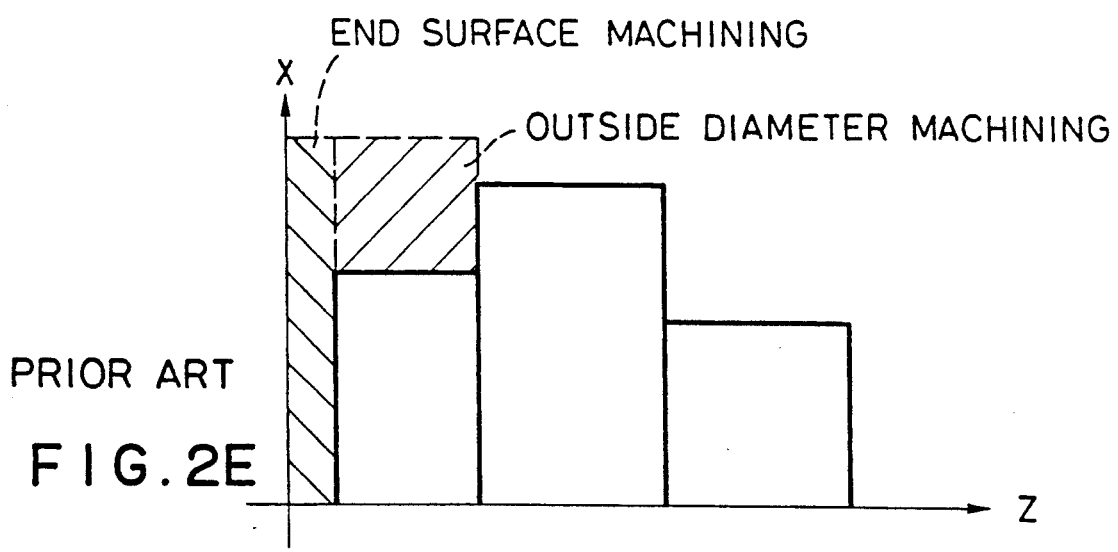
Figure 3A:
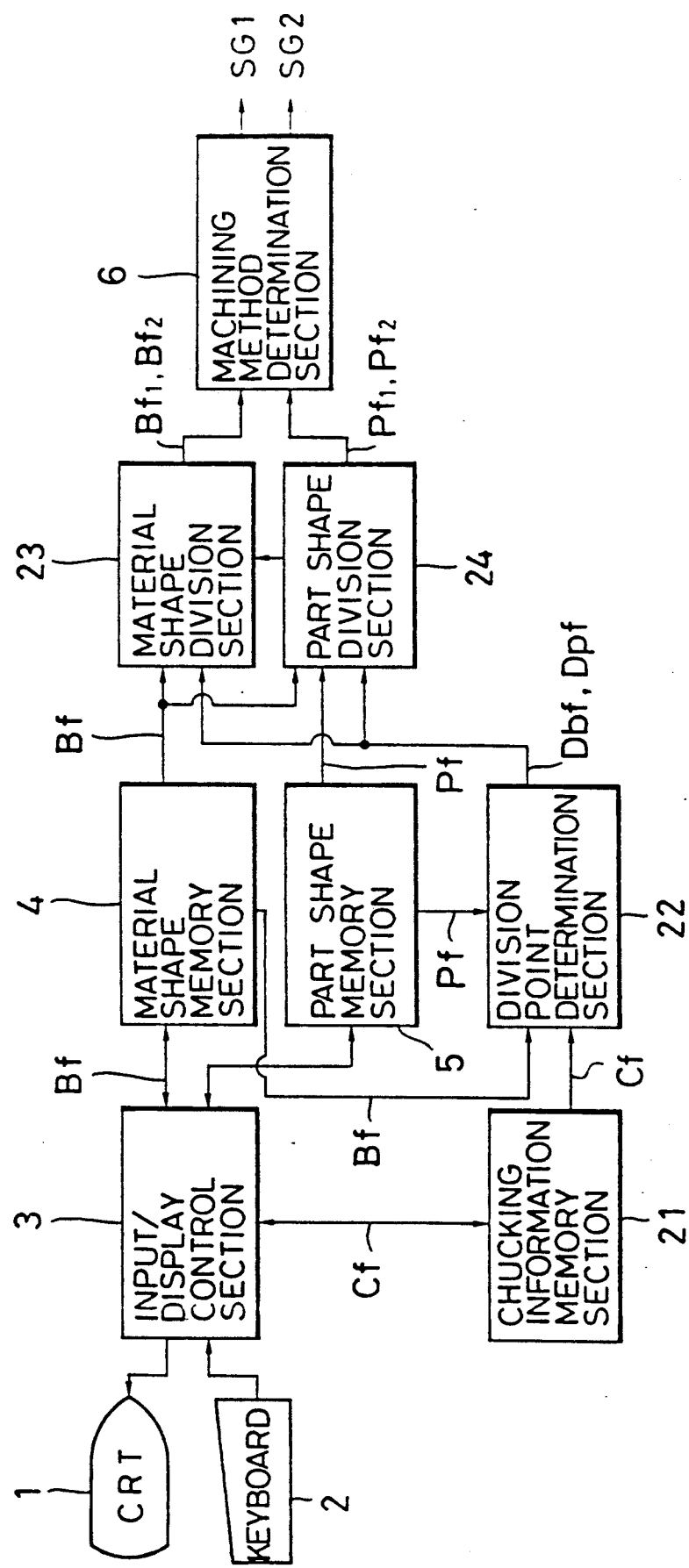

FIGS. 3A and 3B are block diagrams showing, in comparison with FIG. 1, an NC information generating apparatus in accordance with an embodiment of the present invention. Blocks of FIGS. 3A and 3B corresponding to those shown in FIG. 1 are indicated by the same reference characters, and the description for them will not be repeated.

Information $C_f$ on the shape of chuck jaws of a machine tool input by the operator using a CRT 1 and a keyboard 2 is stored in a chucking information memory section 21 through an input/display control section 3. Material shape information $B_f$ and part shape information $P_f$ and jaw shape information $C_f$ are respectively stored in a material shape memory section 4, a part shape memory section 5 and the chucking information memory section 21 and are read out to a division point determination section 22 to determine a first/second step material division point $D_{bf}$ and a first/second step part division point $D_{pf}$. Data on these points is set to a material shape division section 23 and a part shape division section 24. The material shape information $B_f$ and the part shape information $P_f$ stored in the material shape memory section 4 and the part shape memory section 5 are read out to the part shape division section 24. Based on these categories of data $B_f$ and $P_f$ and the first/second step material division point $D_{bf}$ and the first/second step part division point $D_{pf}$ sent from the division point determination section 22, part shape information $P_{f1}$ for the first step and part shape information $P_{f2}$ for the second step are produced and are sent to a machining method determination section 6. The part shape information $P_{f1}$ for the first step is also sent to the material shape division section 23. The material shape information $B_f$ stored in the material shape memory section 4 is read out to the material shape division section 23 to produce material shape information $B_{f1}$ for the first step which is sent to the machining method determination section 6, while the material shape information $B_{f2}$ for the second step is produced based on the material shape information $B_f$, the first/second step material division point $D_{bf}$ and the first/second step part division point $D_{pf}$ sent from the division point determination section 22, and the part shape information $P_{f1}$ for the first step sent from the part shape division section 24, and is sent to the machining method determination section 6. Machining method information $M_{f1}$ for the first step and machining method information $M_{f2}$ for the second step are determined based on the groups of the material shape information $B_{f1}$ and $B_{f2}$ for the first and second steps sent from the material shape division section 23 and the groups of part shape information $P_{f1}$ and $P_{f2}$ for the first and second steps sent from the part shape division section 24. The groups of machining method information $M_{f1}$ and $M_{f2}$ thereby determined are stored in a first step machining method memory section 25 and a second step machining method memory section 26, respectively. The first step machining method information $M_{f1}$ and the second step machining method information $M_{f2}$ stored in the first step machining method memory section 25 and the second step machining method memory section 26 are read out to an NC information producing section 8 to produce groups of NC information $N_{f1}$ and $N_{f2}$ for the first and second steps, which are stored in an NC information memory section 9.

Figure 4:
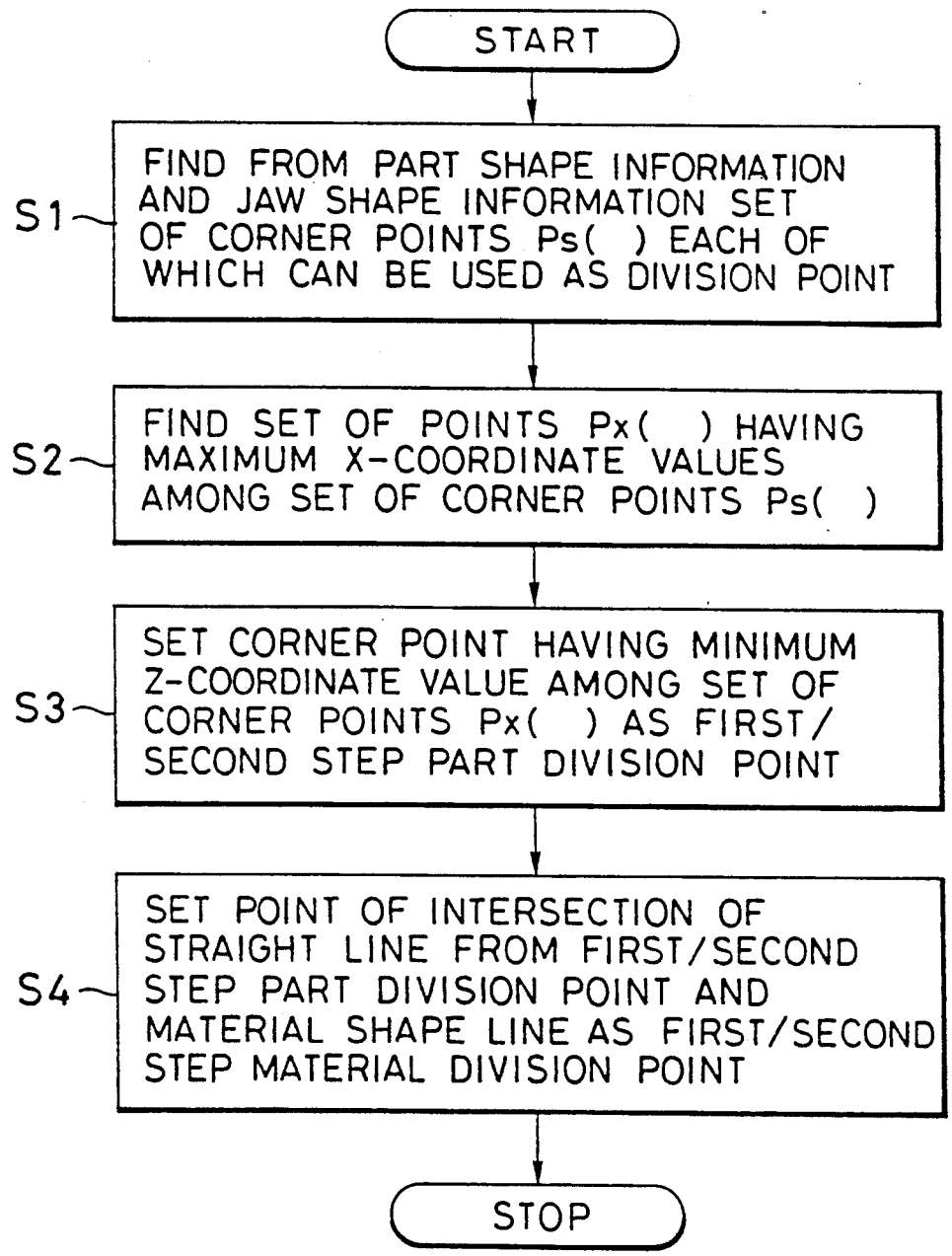
FIGS. 4 and 6 are flowcharts of examples of the operation of the apparatus shown in FIG. 3.

An example of the operation of the thus constructed apparatus will be described below with reference to the flowchart of FIG. 4.

Figure 5A:
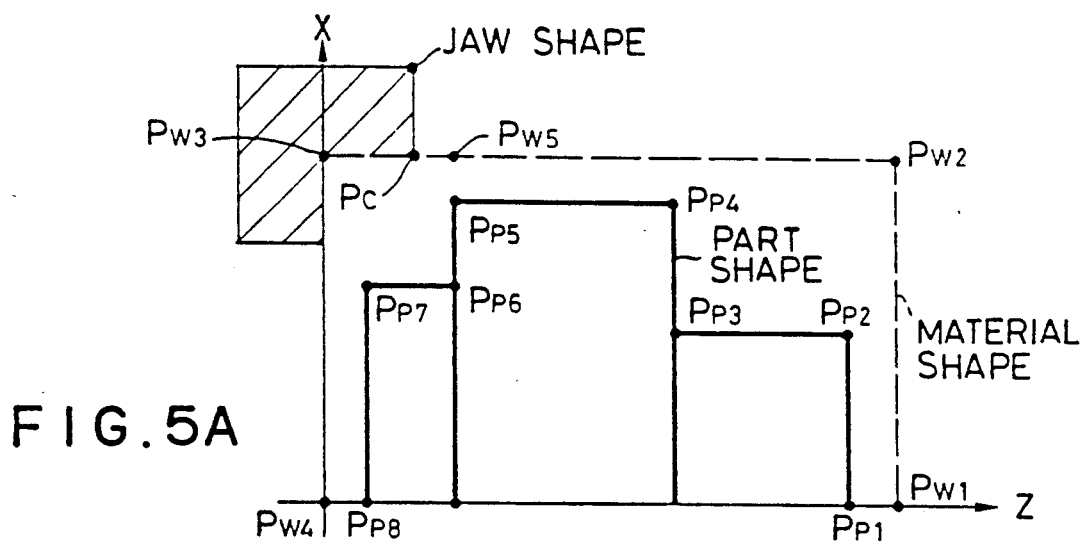
FIGS. 5A to 5C and 7A to 7C are diagrams of examples of data relating to the respective flowcharts shown in FIGS. 4 and 6.

In a case where categories of information on a material shape, a part shape and a jaw shape such as those expressed in FIG. 5A are stored in the respective memory sections 4, 5 and 21, the division point determination section 22 finds a set of corner points $P_s$ ($P_{p1}$, $P_{p2}$, $P_{p3}$, $P_{p4}$, $P_{p5}$ and $P_{p6}$) having Z-coordinate values larger than the Z-coordinate value of a point $P_c$ from corner points $P_{p1}$ to $P_{p8}$ on the part shape (Step S1). Next, the division point determination section 22 finds a set of points $P_x$ ($P_{p4}$, $P_{p5}$) having maximum X-coordinate values among the set $P_s$ (Step S2), and finds a corner point $P_{p5}$ having a minimum Z-coordinate value among the set $P_x$ (Step S3). The corner point $P_{p5}$ is determined as a first/second step part division point of an outside diameter machining portion. A straight line is extended from the first/second step part division point $P_{p5}$ in the X-axis positive direction, and a point of intersection $P_{w5}$ of this line and the line indicating the material shape is obtained (Step S4). The point of intersection $P_{w5}$ is determined as a first/second step material division point.

Figure 5B:
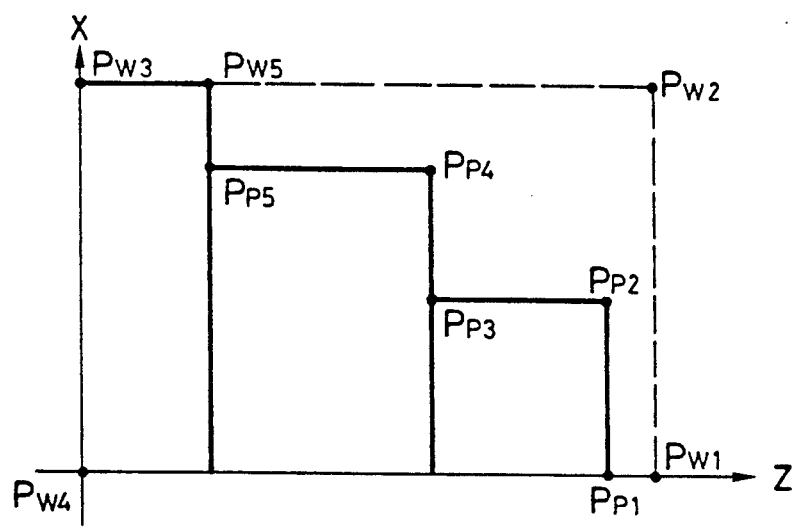
Figure 5C:
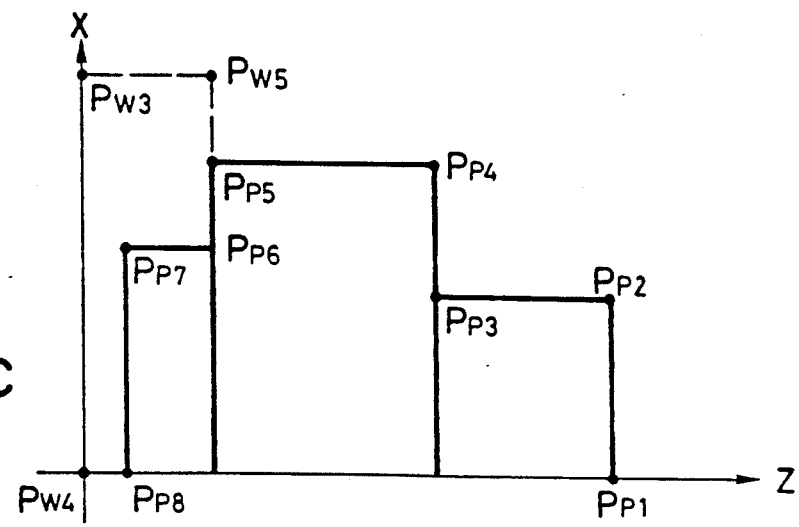

The part shape division section 24 produces first step part shape information $P_{p1} \rightarrow P_{p2} \rightarrow P_{p3} \rightarrow P_{p4} \rightarrow P_{p5} \rightarrow P_{w5} \rightarrow P_{w3} \rightarrow P_{w4}$ as shown in FIG. 5B and second step part shape information $P_{p8} \rightarrow P_{p7} \rightarrow P_{p6} \rightarrow P_{p5} \rightarrow P_{p4} \rightarrow P_{p3} \rightarrow P_{p2} \rightarrow P_{p1}$ as shown in FIG. 5C based on the supplied the material shape information and the part shape information and the determined first/second step part division point $P_{p5}$ and first/second step material division point $P_{w5}$.

The material shape division section 23 produces first step material shape information $P_{w1} \rightarrow P_{w2} \rightarrow P_{w3} \rightarrow P_{w4}$ as shown in FIG. 5B based on the supplied material shape information, and produces second step material shape information $P_{w4} \rightarrow P_{w3} \rightarrow P_{w5} \rightarrow P_{p5} \rightarrow P_{p4} \rightarrow P_{p3} \rightarrow P_{p2} \rightarrow P_{p1}$ as shown in FIG. 5C based on the determined first/second step part division point $P_{p5}$ and first/second step material division point $P_{w5}$ and the produced first step part shape information $P_{p1} \rightarrow P_{p2} \rightarrow P_{p3} \rightarrow P_{p4} \rightarrow P_{p5} \rightarrow P_{w5} \rightarrow P_{w3} \rightarrow P_{w4}$.

The machining method determination section 6 determines first step machining method information based on the produced first step part shape information and first step material shape information and stores the determined information in the first step machining method memory section 25. The machining method determination section 6 also determines second step machining method information based on the produced second step part shape information and second step material shape information and stores the determined information in the second step machining method memory section 26. The NC information producing section 8 produces a first step NC information based on the determined first step machining method information, and produces a second step NC information based on the determined second step machining method information.

Figure 6:
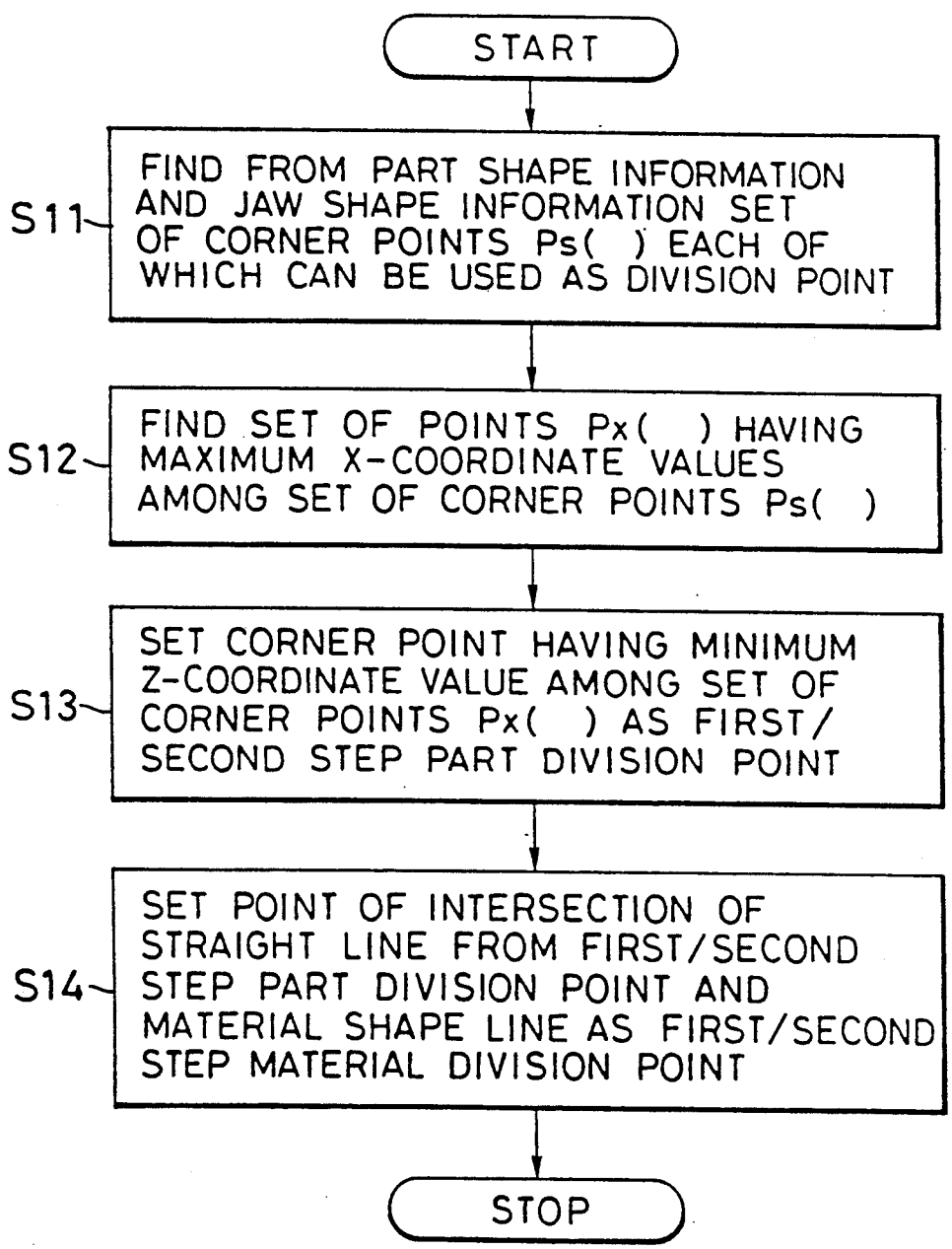
Figure 7A:
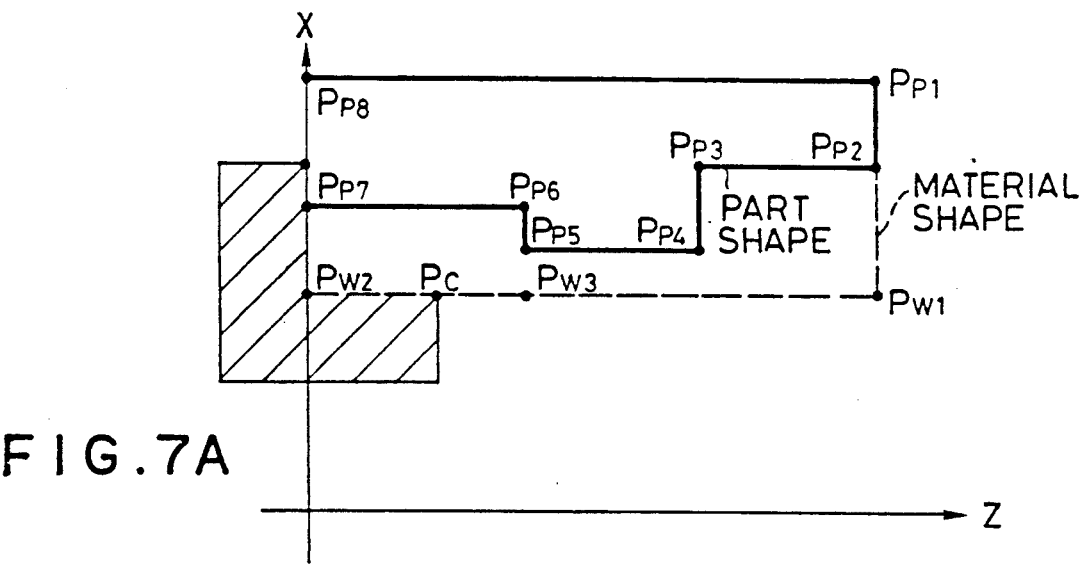
Figure 7B:
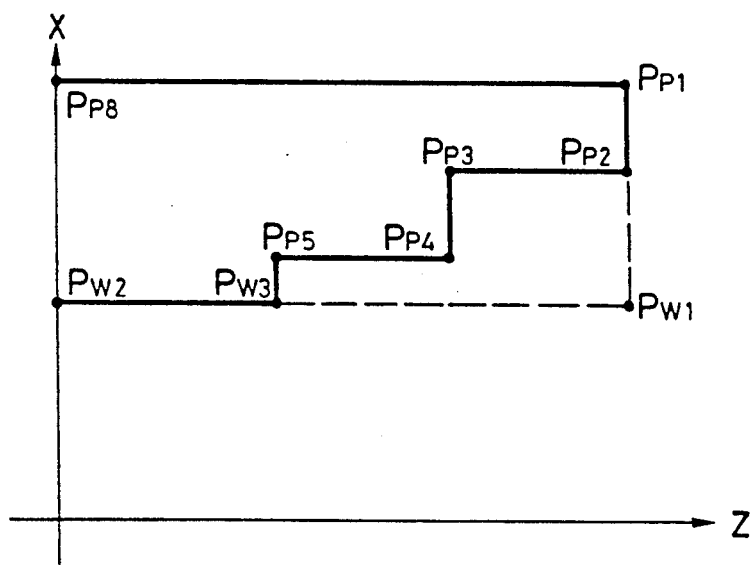
Figure 7C:
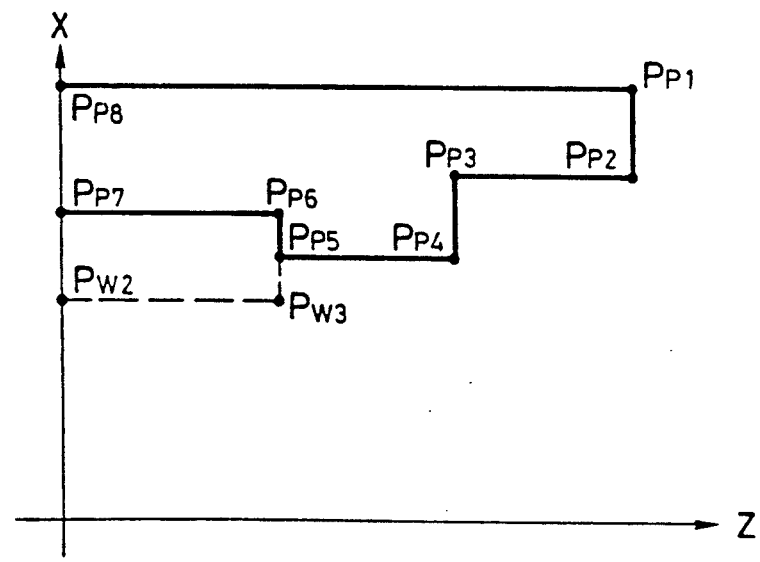

An example of the operation for machining material having an inside diameter machining portion such as that expressed in FIG. 7A will be described below with reference to the flowchart of FIG. 6. The division point determination section 22 finds a set of corner points $P_S$ ($P_{p1}$, $P_{p2}$, $P_{p3}$, $P_{p4}$, $P_{p5}$ and $P_{p6}$) having Z-coordinate values larger than the Z-coordinate value of a point $P_C$ from corner points $P_{p1}$ to $P_{p8}$ on the part shape (Step S11), finds a set of points $P_X$ ($P_{p4}$, $P_{p5}$) having maximum X-coordinate values among the set $P_S$ (Step S12), and finds a corner point $P_{p5}$ having a minimum Z-coordinate value among the set $P_X$ (Step S13). The corner point $P_{p5}$ is determined as a first/second step part division point of the inside diameter machining portion. A straight line is extended from the first/second step part division point $P_{p5}$ in the X-axis negative direction, and a point of intersection $P_{w3}$ of this line and the line indicating the material shape is obtained (Step S14). The point of intersection $P_{w3}$ is determined as a first/second step material division point.

Subsequently, the operation is conducted in accordance with the same procedure as the above described example to produce the first step NC information and the second step NC information.

It should be understood that many modifications and adaptations of the invention will becom apparent to those skilled in the art and it is intended to encompass such obvious modifications and changes in the scope of the claims appended hereto.

What is claimed is:

1. An apparatus for generating numerical control information for machining a part member, comprising:
a division point determination means for determining a division point between first and second steps based on a material shape, a part shape and a jaw shape supplied;
a part shape division means for generating a first step part shape and a second step part shape based on the division point, the material shape and the part shape; and
a material shape division means for generating a first step material shape and a second step material shape based on the division point, the material shape and the first step part shape;
wherein numerical control information for the first step is formed from the first step material shape and the first step part shape, while numerical control information for the second step is formed from the second step material shape and the second step part shape;
and wherein said division point determination means finds a first group of corner points which do not interfere with a jaw shape from a group of corner points on the part shape, and finds a second group of corner points having maximum coordinate values in a diametral direction of the part shape from among the first group of corner points, and finds a corner point having a minimum coordinate value in a longitudinal direction of the part shape from among the second group of corner points, the corner point thereby being used as the division point for outside diameter machining.

2. An apparatus for generating numerical control information for machining a part member, comprising:
a division point determination means for determining a division point between first and second steps based on a material shape, a part shape and a jaw shape supplied;
a part shape division means for generating a first step part shape and a second step part shape based on the division point, the material shape and the part shape; and
a material shape division means for generating a first step material shape and a second step material shape based on the division point, the material shape and the first step part shape;
wherein numerical control information of the first step is formed from the first step material shape and the first step part shape, while numerical control information for the second step is formed from the second step material shape and the second step part shape;
and wherein said division point determination means finds a first group of corner points which do not interfere with the jaw shape from a group of corner points on the part shape, and finds a second group of corner points having minimum coordinate values in a diametral direction of the part shape from among the first group of corner points, and finds a corner point having a minimum coordinate value in a longitudinal direction of the part shape from among the second group of corner points, the corner point thereby found being used as the division point for inside diameter machining.

* * * * *